Patented Nov. 11, 1924.

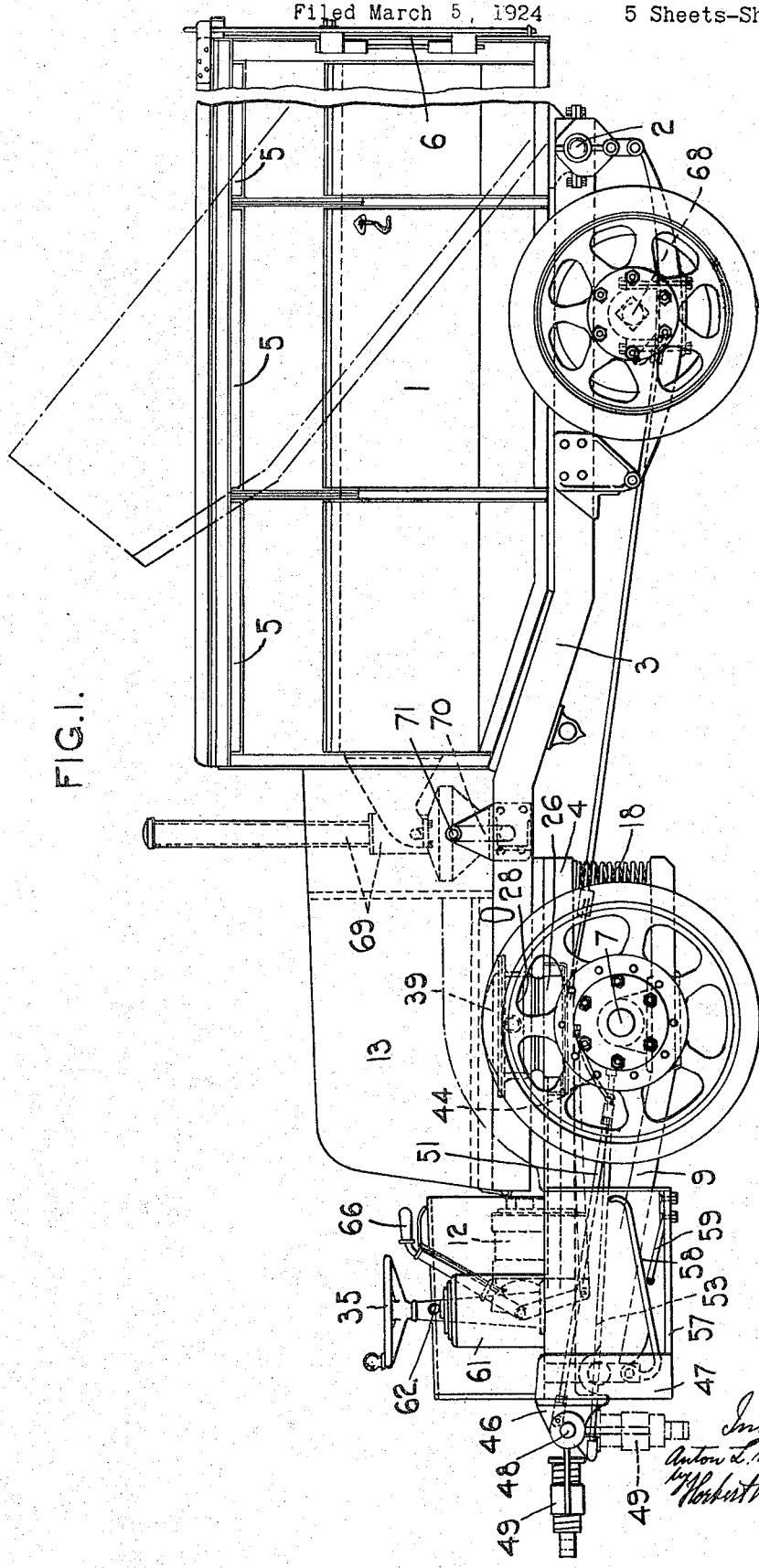

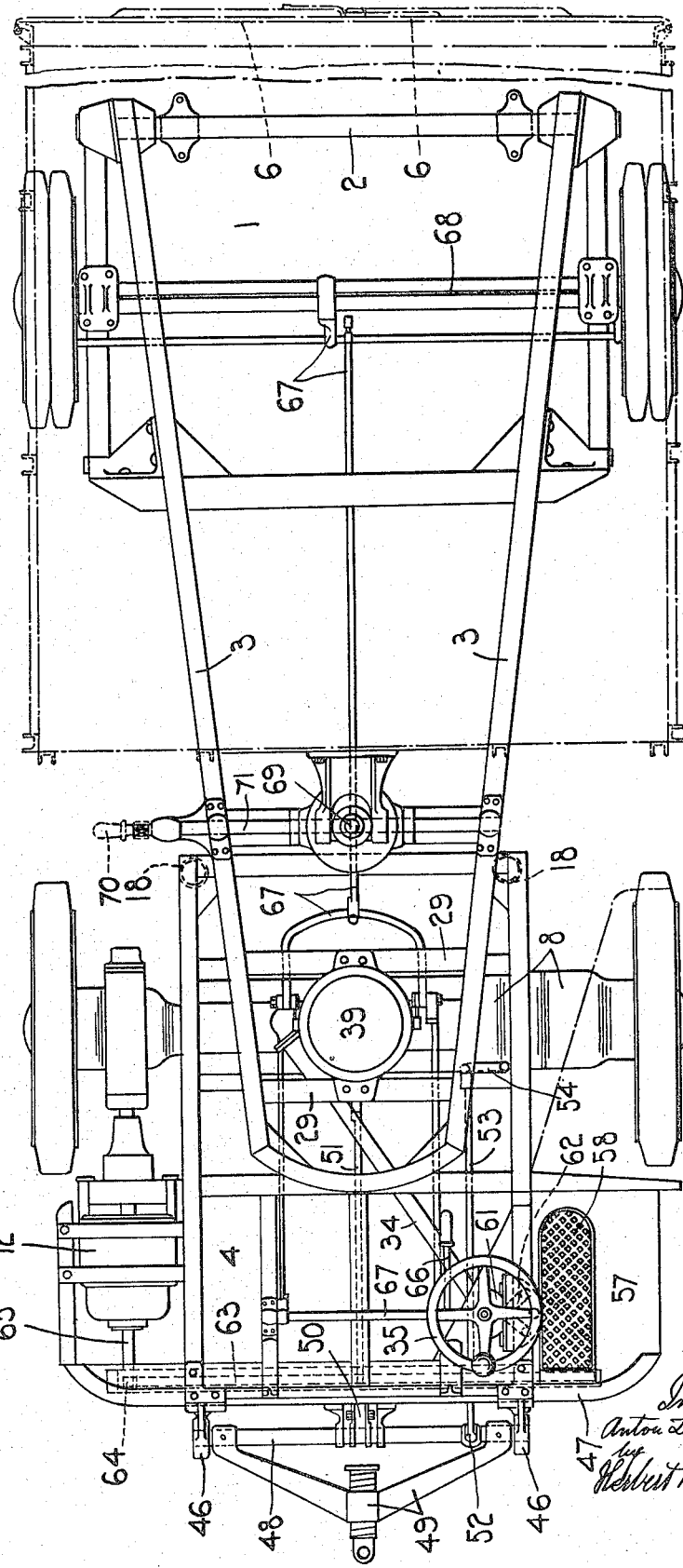

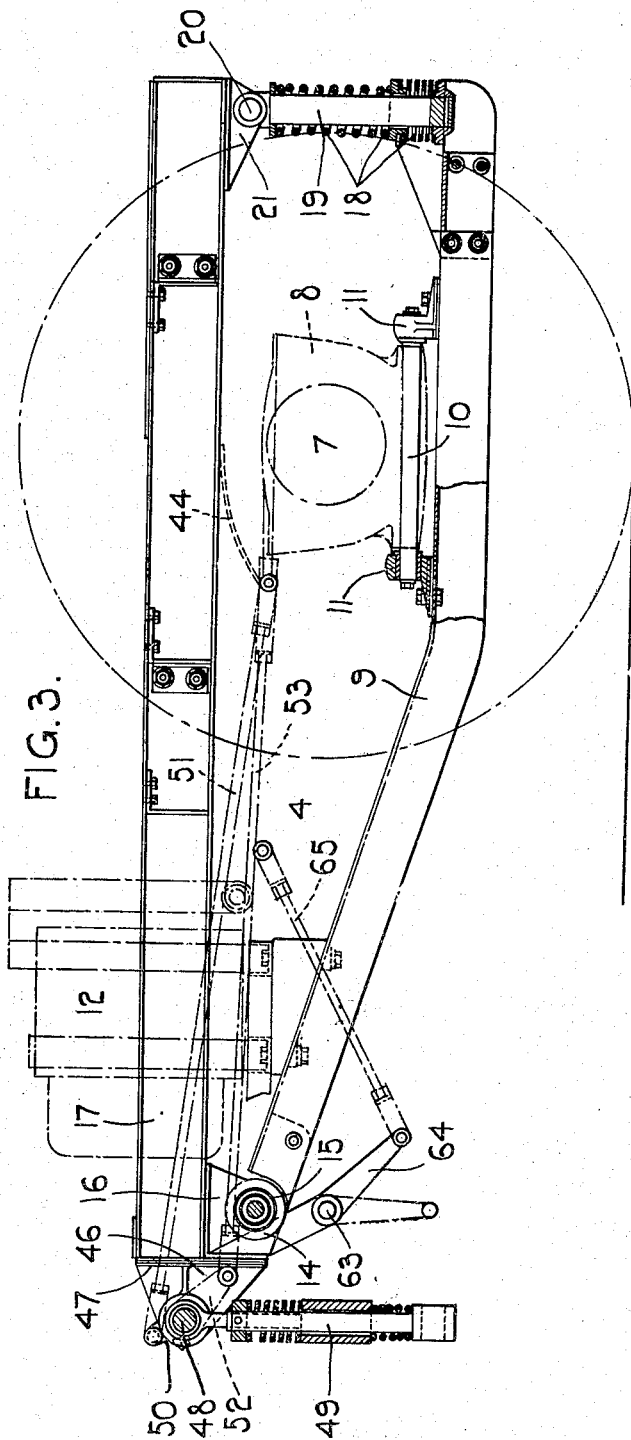

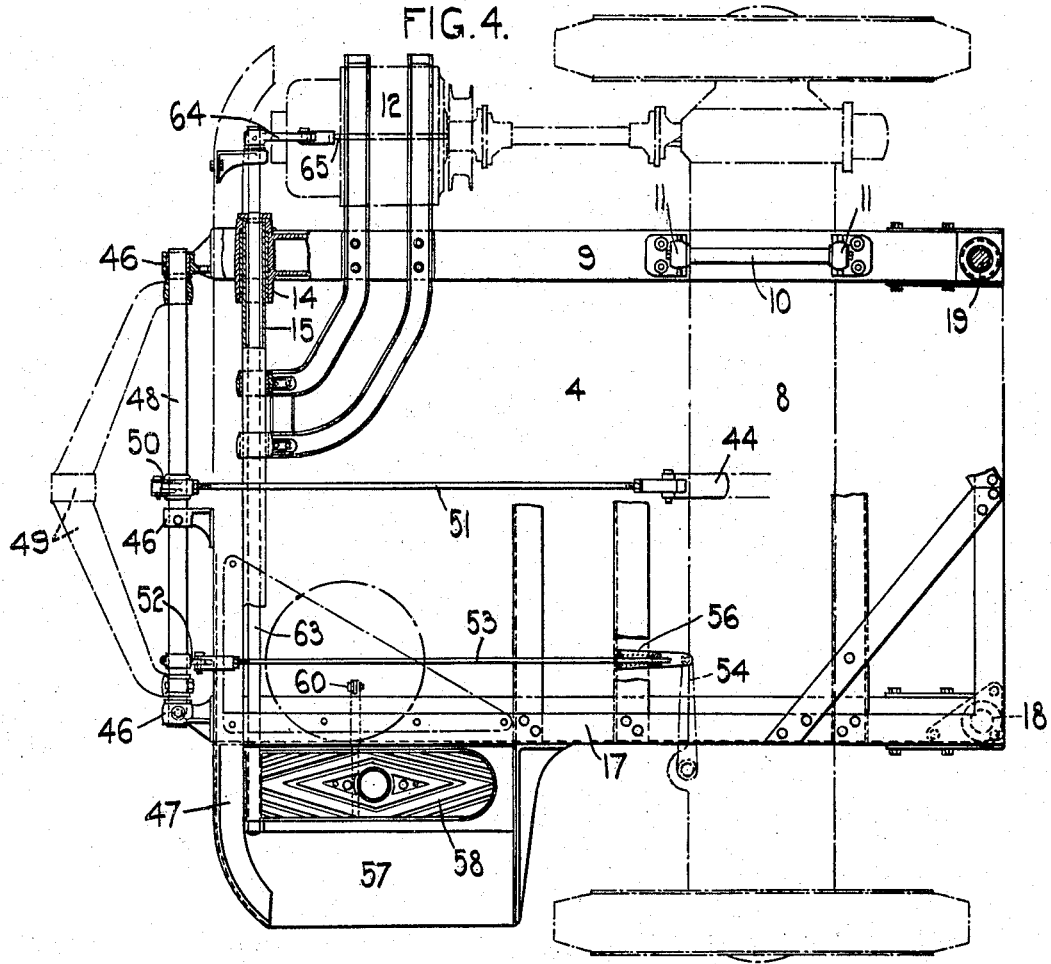
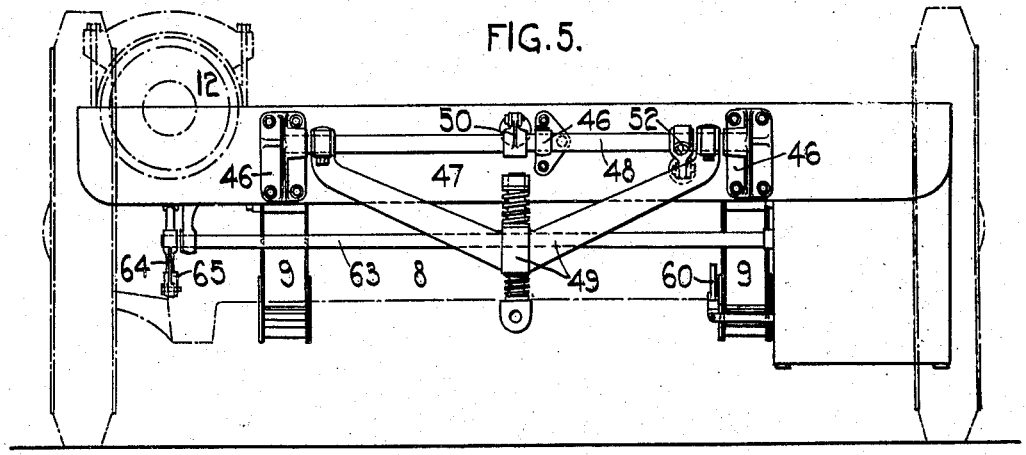

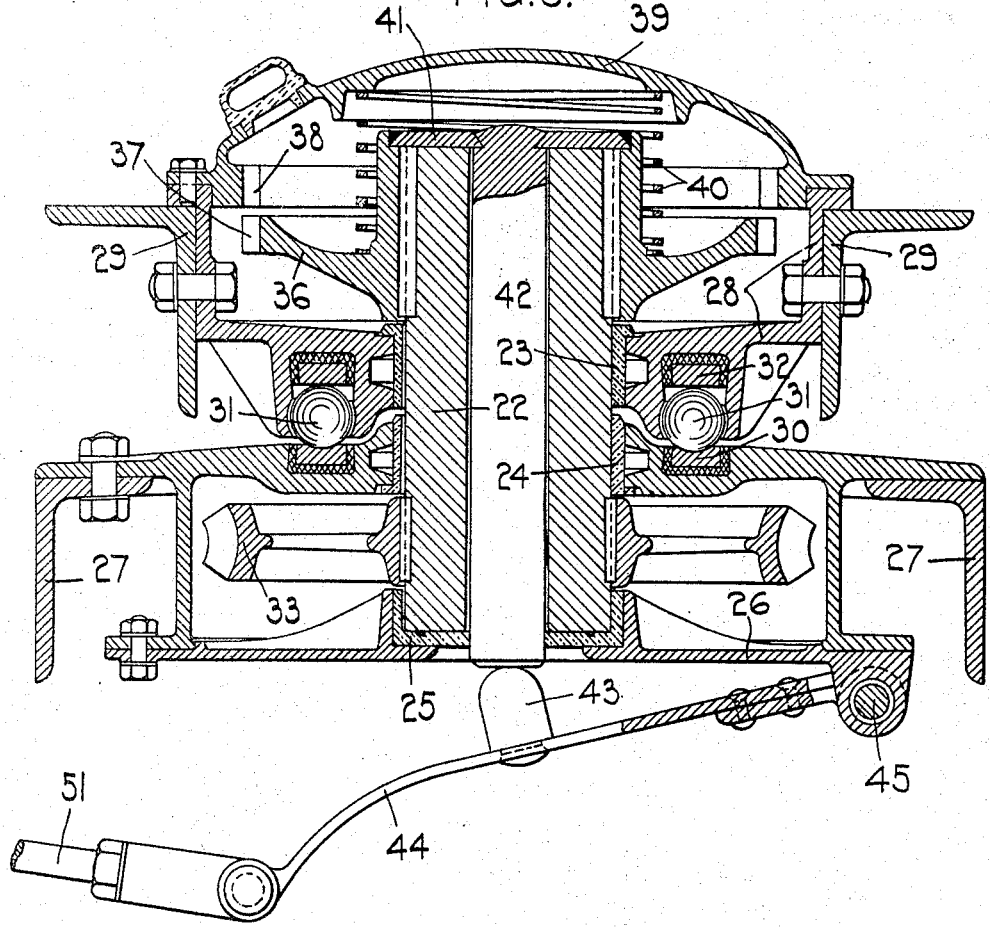

1,515,090

UNITED STATES PATENT OFFICE.

ANTON LOUIS BROEKMAN, OF YORK, ENGLAND.

MOTOR VEHICLE AND TRAILER.

Application filed March 5, 1924. Serial No. 697,066.

*To all whom it may concern:*

Be it known that I, ANTON LOUIS BROEKMAN, a subject of the Queen of the Netherlands, residing at York, in the county of York, England, have invented certain new and useful Improvements in and Relating to Motor Vehicles and Trailers; and I do hereby declare the following to be a full, clear, and exact description of the invention, such as will enable others skilled in the art to which it appertains to make and use the same.

This invention relates to vehicles propelled by electric motor, internal combustion engine or similar power unit as most convenient, and comprises novel mechanical features whereby the efficiency of the said vehicle is enhanced and economies in transit costs effected.

I provide my vehicle with a power unit, steering gear and all other necessary mechanism and parts so that it may be used as a self-propelling vehicle or as a tractor; and I also provide draw gear and mechanism whereby the power unit, controlling mechanism, steering gear, etc., are automatically uncoupled and thrown out of action when the vehicle is coupled to a tractor so that it may be used as a trailer.

Where necessary tipping or elevating mechanism for the platform or body of the vehicle is fitted.

Figs. 1 and 2 of the accompanying illustrative drawings show in elevation and plan, respectively, a motor vehicle (which may be designated "an electric automotive trailer") embodying the invention.

Figs. 3 and 4 show in sectional elevation and in sectional plan respectively, the fore-carriage of a motor vehicle embodying the invention.

Fig. 5 shows the fore-carriage in end elevation, and,

Fig. 6 is a central vertical section illustrating the steering gear and the declutching mechanism.

The vehicle illustrated comprises a body 1 mounted to tip about an axle 2 carried by the metal underframe structure 3, and a fore-carriage 4 that carries the power unit, controlling mechanism, steering gear and other necessary controlling mechanism.

Although the type of body 1 is immaterial to the present invention, it may be stated that the body in Fig. 1 and indicated in dotted lines in Fig. 2, is furnished with spring rollers covers at 5, Fig. 1, and with hinged end doors 6.

The front axle 7 is mounted in an axle case 8 carried by the lower channel-sectioned members 9 of the fore-carriage, the connection being effected at each side of the frame by a pin 10, and brackets 11, see Fig. 3 and the upper part of Fig. 4.

The power unit consists of an electric motor 12 mounted on the fore-carriage and supplied with electric current from suitable batteries carried in a compartment 13 provided therefor on the forward portion of the underframe structure 3. The front ends of the lower side members 9 of the fore-carriage terminate in sleeves 14 mounted to rock upon a transverse hollow shaft 15 that is carried in brackets 16 fixed to the upper structure 17 of the fore-carriage. Between the rear ends of the lower side members 9 of the fore-carriage and the upper structure 17 thereof, cushioning springs 18 are arranged, the said springs being mounted on rods 19 depending from pivots 20 mounted in brackets 21 fixed to the rear ends of the side members of the upper structure 17.

The fore-carriage is mounted to oscillate on a vertical pivot 22, Fig. 6, mounted to oscillate in bearings 23 and 24 and the lower end of which is supported in a footstep bearing 25 which, together with the bearing 24, is carried by a housing 26 fixed to transverse members 27 of the fore-carriage. The upper bearing 23 of the pivot 22 is carried by an upper housing 28 fixed to transverse members 29 of the forward part of the vehicle under structure 3. The housing 26 of the fore-carriage is fitted with a race 30 for an annular row of balls 31, the upper race 32 for which is fixed in the upper housing 28. Keyed on the pivot 22, between the footstep bearing 25 and the bearing 24, is a wormwheel or wormwheel segment 33 into which gears a worm on a shaft 34, Fig. 2, adapted to be rotated by the steering wheel 35 located near the front of the fore-carriage. Feathered on the upper end of the pivot 22, above the bearing 23, is a clutch disc 36 having peripheral teeth 37 adapted, when the disc 36 is raised, to engage a ring of internal teeth 38 formed in a mushroom-shaped cover 39 fixed to the upper housing 28. A spring 40 located between the clutch disc 36 and the cover 39 tends to press the clutch disc 36 downwardly into its free position shown in Fig. 6. In this position the fore-carriage can freely turn about the axis of the pivot 22 as desired when the vehicle is connected to a tractor. Should the steering hand wheel 35 be operated at such time no effect whatever would be produced upon the front axle as the pivot 22 and the steering wormwheel or segment 33 would merely rotate idly in the bearings 23 and 24. Fixed as by welding on to the boss of the clutch disc 36 is a plate 41 to which is riveted the upper end of an actuating pin 42 that extends freely through the hollow pivot 22. Bearing upon the lower end of the said pin 42 is a stud 43 projecting upwardly from a plate spring lever 44 mounted upon a hinge pin 45 carried by the lower housing 26.

Mounted to rock in brackets 46 projecting forwardly from the front member 47 of the fore-carriage, is a pivot bar 48 on which the draught link 49 is fixed. Also fixed on the draught pivot bar 48 is a crank 50 (see Fig. 3) connected by a rod 51 to the spring lever 44 that controls the clutch disc actuating pin 42. In addition to the crank 50 the draught pivot bar 48 has fixed on it another crank 52 which, through a rod 53, operates one arm 54 of a bell-crank lever that actuates a driving clutch (not shown) on the front axle 7. The bell-crank lever works on a vertical pivot, and its lower part and the driving clutch mechanism are not shown as they are inclosed in the axle case 8 and are of any approved construction.

The construction and arrangement are such that in normal automotive position the draught link 49 hangs vertically, as shown in Fig. 3, and in this position the driving clutch of the front axle 7 is in engagement and the clutch disc 36 is raised against the action of the spring 40 and is in engagement with the internal teeth 38 of the fixed housing cover 39 consequently the steering gear is operative and the front axle is in positive driving connection with the motor 12. Upon lifting the draught link 49 in order to attach the vehicle to a tractor, the draught pivot bar 48 is partly rotated and the cranks 50 and 52 thereon are consequently so moved as to declutch the steering mechanism and withdraw the driving clutch with the result that the front wheels can rotate freely independently of the driving motor and gear, and the fore-carriage is free to oscillate about the axis of the pivot 22 in exactly the same manner as an ordinary trailer front axle. In order to prevent any oscillation of the draught link 49 affecting the clutches except when the link is swung through a quadrant, that is to say is moved from normal automotive position to normal trailing position, the rods 51 and 53 are furnished with spring tension devices, such for example as shown at 56, Fig. 4, in connection with the rod 53.

At the front of the fore-carriage and on the foot-path side of the vehicle, a step or platform 57 is provided for the driver. A driving pedal 58 is normally held by a blade spring 59 in a raised position relatively to the platform 57. The surface of the pedal 58 may be variously corrugated to prevent slip, as shown in Figs. 2 and 4. When the pedal 58 is depressed against the action of the spring 59 it so moves a trip rod 60 (see Fig. 4) as to actuate interlocking mechanism on the controller 61 and thereby render possible the operation of the hand control lever 62. This lever operates the controller which is used when the motor 12 is an electric motor as hereinbefore described. The pedal pivot shaft 63 has fixed on it an arm 64 connected by link and lever mechanism 65 with a brake on the motor driving shaft, the arrangement being such that the said brake is applied when the pedal is released. Simultaneously the controller is returned to the "off" position by the action of the trip rod 60. This arrangement is fool-proof and it also has the further advantage of ensuring that the brake is automatically maintained on whenever the vehicle is left standing.

66, Figs. 1 and 2, indicates a lever that, through link and lever mechanism 67 controls a brake on the rear axle 68.

For tipping the vehicle body 1 mechanism, indicated at 69, and comprising a compound screw and rotary worm nut is mounted on the forward part of the vehicle, the mechanism being operated by a hand crank 70 at one end of a shaft 71 extending transversely across the vehicle. The brake on the motor driving shaft, and the separate brake on the rear axle 68 are not shown, as they are of any approved construction. These two brakes and the tipping mechanism are not hereinafter claimed, but are mentioned as the use of these parts is advantageous on a vehicle as hereinafter claimed.

While certain specific constructions and arrangements of parts have been herein described it is to be understood that modified or alternative constructions and arrangements might be adopted without departing from the invention, provided such be not patentably different from the issues set up by the claims annexed.

What I claim is:—

1. The combination, with a self-propelling motor vehicle provided with a disengageable motor and disengageable steering mechanism, of a draft attachment carried by the said vehicle and adapted to connect it to a tractor, and means for disengaging the said motor and steering mechanism automatically when the said draft attachment is moved from its normal inoperative position into a position for coupling it to the tractor, thereby converting the said motor vehicle into a trailer.

2. The combination, with a convertible self-propelling motor vehicle and trailer provided with a motor and with steering mechanism having clutch devices, of a draft attachment for connecting the said vehicle to a tractor, and means for operating the clutch devices from the draft attachment automatically when the said draft attachment is moved into a position for coupling it to the tractor, thereby converting the motor vehicle into a trailer.

3. A combination of parts set forth in claim 1 in which the said vehicle is provided with a fore-carriage which supports all the said parts and which is free to oscillate on a vertical axis to effect the steering of the vehicle.

4. The combination, with a self-propelling vehicle provided with a disengageable motor and disengageable steering mechanism, of a draft link pivoted to the front end of the vehicle and adapted to connect it to a tractor so that it may be used as a trailer, and cranks and operating devices connected with the said draft link and operating to disengage the said motor and steering mechanism automatically when the said draft link is placed in a position for coupling it to the tractor.

5. The combination, with a self-propelling vehicle provided with a disengageable motor and disengageable steering mechanism, of a draft link pivoted to the front end of the vehicle and adapted to connect it to a tractor so that it can be used as a trailer, cranks and operating devices connected with the said draft link and operating to disengage the said motor and steering mechanism automatically when the said draft link is placed in a position for coupling it to a tractor, and spring tension devices inserted in the said operating devices to prevent the disengagement of the motor and steering mechanism until the draft link has been moved to a predetermined extent from its normal inoperative position.

In testimony whereof I affix my signature.

ANTON LOUIS BROEKMAN.

Witnesses:
H. J. GREGORY,
JAS. C. McLOE.